United States Patent
Allred

(10) Patent No.: US 12,421,404 B2
(45) Date of Patent: Sep. 23, 2025

(54) WATER-BASED PRINTING INK COMPOSITIONS

(71) Applicant: SUN CHEMICAL CORPORATION, Parsippany, NJ (US)

(72) Inventor: Davis Allred, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 577 days.

(21) Appl. No.: 17/775,669

(22) PCT Filed: Nov. 17, 2020

(86) PCT No.: PCT/US2020/060836
§ 371 (c)(1),
(2) Date: May 10, 2022

(87) PCT Pub. No.: WO2021/101860
PCT Pub. Date: May 27, 2021

(65) Prior Publication Data
US 2022/0411649 A1 Dec. 29, 2022

Related U.S. Application Data

(60) Provisional application No. 62/939,141, filed on Nov. 22, 2019.

(51) Int. Cl.
| | |
|---|---|
| *C09D 11/00* | (2014.01) |
| *C09D 11/033* | (2014.01) |
| *C09D 11/037* | (2014.01) |
| *C09D 11/08* | (2006.01) |
| *C09D 11/12* | (2006.01) |
| *D06P 1/34* | (2006.01) |
| *D06P 1/46* | (2006.01) |

(52) U.S. Cl.
CPC .......... *C09D 11/033* (2013.01); *C09D 11/037* (2013.01); *C09D 11/08* (2013.01); *C09D 11/12* (2013.01); *D06P 1/34* (2013.01); *D06P 1/46* (2013.01)

(58) Field of Classification Search
CPC ..... C09D 11/033; C09D 11/037; C09D 11/08; C09D 11/12; D06P 1/34; D06P 1/46
USPC ................. 106/31.01, 31.13, 31.4
See application file for complete search history.

(56) References Cited

U.S. PATENT DOCUMENTS

| | | |
|---|---|---|
| 3,897,204 A | 7/1975 | Mizuma |
| 4,857,624 A | 8/1989 | Deblasi |
| 5,164,446 A | 11/1992 | Boswell |
| 5,902,389 A | 5/1999 | Jordan |
| 6,583,263 B2 | 6/2003 | Gaudl |
| 2006/0246149 A1 | 11/2006 | Buchholz |

FOREIGN PATENT DOCUMENTS

| | | | | |
|---|---|---|---|---|
| CA | 2303075 | | 4/1999 | |
| CN | 103370381 A | * | 10/2013 | ............... B41J 2/01 |
| CN | 106573485 A | * | 4/2017 | ............... B41J 2/01 |
| CN | 107022242 A | * | 8/2017 | |
| EP | 1 601 728 A2 | | 12/2005 | |
| EP | 3 124 556 A1 | | 2/2017 | |
| GB | 2 526 591 A | | 12/2015 | |
| WO | WO 00/12809 A1 | | 3/2000 | |
| WO | WO 2004/061200 A1 | | 7/2004 | |
| WO | WO 2013/038068 A1 | | 3/2013 | |
| WO | WO-2014056563 A1 | * | 4/2014 | ............... C08K 3/04 |

OTHER PUBLICATIONS

International Search Report issued in International Application No. PCT/US2020/060836, mailed Feb. 12, 2021.
Written Opinion of the International Searching Authority issued in International Application No. PCT/US2020/060836, mailed Feb. 12, 2021.
International Preliminary Report on Patentability (Chapter 1 of the Patent Cooperation Treaty) issued in International Application No. PCT/US2020/060836, mailed Mar. 9, 2022.

* cited by examiner

*Primary Examiner* — James E McDonough
(74) *Attorney, Agent, or Firm* — Marian E. Fundytus; Amster Rothstein & Ebenstein LLP

(57) ABSTRACT

The present invention provides water-based ink and coating compositions comprising greater than 70 wt % natural materials. The ink and coating compositions of the present invention are suitable for printing on feminine care products, baby care products, and other personal care products.

23 Claims, No Drawings

WATER-BASED PRINTING INK COMPOSITIONS

CROSS REFERENCE TO RELATED APPLICATIONS

The present application is a § 371 National Phase application based on PCT/US2020/060836 filed Nov. 17, 2020, which claims the benefit of U.S. Provisional Application No. 62/939,141, filed Nov. 22, 2019, the subject matter of each of which is incorporated by reference in their entirety.

FIELD OF THE INVENTION

The present invention relates to ink and coating compositions that are suitable for printing on cotton and synthetic materials, such as spunbond nonwoven fabrics. The ink and coating compositions of the present invention are suitable, for example, for printing on personal care products that are exposed to moisture. The ink and coating compositions of the present invention comprise greater than 70 wt % natural materials.

BACKGROUND OF THE INVENTION

Inks used to print on personal care products have good adhesion to the substrate and must be resistant to moisture, chemicals, rubbing, etc. Personal care products include, for example, feminine care (e.g. sanitary napkin products), baby care (e.g. diapers), and other personal care end use products. This market is currently dominated by solvent-based inks that are largely based on materials that are not generally regarded as being environmentally friendly (e.g. alcohol-type solvents and acetates; organic pigments; and synthetic resins.

Recently, there has been an interest in formulating inks that contain higher amounts of naturally derived materials, especially water-based inks. Naturally derived materials are those that are derived from plants, minerals, animals, microorganisms, or their reaction products. The amount of naturally derived materials in inks has been restricted because of failure to attain good adhesion, moisture resistance, chemical resistance, rub resistance, and other desirable properties, if the amount of naturally derived materials is too high. In addition, even when naturally derived materials are used in inks, it is generally necessary to include non-natural and environmentally harmful materials, such as petroleum distillates to achieve the necessary properties. This is a particularly an issue when the inks are intended for use on materials used for applications where the product is exposed to moisture, chemicals, or rubbing.

CA 2303075 discloses inks containing maleic modified rosin resins. However, these inks do not contain water, and contain high amounts of organic solvents that are generally considered to be harmful to the environment.

U.S. Pat. No. 4,857,624 discloses use of phenolic modified rosin ester in gravure printing inks. U.S. Pat. No. 5,164,446 describes rosin ester resins modified with a hydroxyl functional polymer, such as an acrylic polymer, for use in gravure printing inks.

U.S. Pat. No. 5,902,389 discloses rosin-based resin ink vehicles. However, these ink vehicles must contain high amounts of petroleum distillates as high boiling point ink oil.

U.S. Pat. No. 6,583,263 describes the synthesis of acrylated rosin esters. Although use of these acrylated rosin esters in energy-curable inks is mentioned, there is no teaching of how much can be included in an ink, and there are no examples showing use in an ink.

Thus, there is still a need for ink and coating compositions that comprise high amounts of natural materials

SUMMARY OF THE INVENTION

The present invention provides ink and coating comprising primarily natural materials. For example, the ink and coating compositions of the present invention comprise greater than 70 wt % natural materials. The ink and coating compositions of the present invention exhibit moisture, chemical, and abrasion resistance. Advantageously, the ink and coating compositions are suitable for printing on personal care products that are exposed to moisture, such as body fluids, etc.

In a particular aspect, the present invention provides a water-based ink or coating composition comprising:
  a) 20 wt % to 70 wt % water, based on the total weight of the composition; and
  b) one or more other natural materials;
  wherein at least one of the other natural materials is a natural resin; and
  wherein the ink or coating composition comprises greater than 70 wt %, up to 100 wt % natural materials, based on the total weight of the composition In certain aspects, the ink and coating compositions of the present invention comprise greater than 70 wt % natural materials. Advantageously, the ink and coating compositions of the present invention may comprise 100 wt % natural materials.

The present invention provides printed substrates comprising the ink and coating compositions of the present invention, and methods of preparing same. The substrates include, but are not limited to cotton and spunbond fabrics.

The present invention provides printed articles comprising substrates printed with the ink or coating composition of the present invention.

These and other objects, advantages, and features of the invention will become apparent to those persons skilled in the art upon reading the details of the formulations and methods as more fully described below.

DETAILED DESCRIPTION OF THE INVENTION

Printing on personal care products that are exposed to moisture, chemicals, abrasion, etc. is challenging. Personal care products include, but are not limited to, feminine care products, baby care products, and other personal care products. Currently, inks used for this purpose are largely dominated by solvent-based inks that contain high amounts of materials that are generally considered to no be environmentally safe. The present invention provides ink and coating compositions that comprise greater than 70 wt % natural materials.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

As used herein, "substrate" means any surface or object to which an ink or coating can be applied. Substrates include, but are not limited to, cellulose-based substrates, paper, paperboard, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

As used herein, "natural material" are materials that are botanic (plant-based), mineral-based, of animal original, derived from microorganisms, their reaction products, and combinations thereof, and water. Natural materials may be used as they occur in nature, or they can undergo processing that does not significantly alter the original physical, chemical, or biological state of the ingredient. Examples of permissible processing include dehydration, extraction, extrusion, centrifugation, filtration, distillation, grinding, sieving, compression, freezing, drying, milling, etc. Natural materials include water, natural resins, natural defoamers, natural waxes, natural colorants, bio-solvents, natural minerals, and the like.

As used herein, "plant-based" refers to materials that equal to or greater than 50% of the ingredient mass from plant-based sources.

As used herein, "naturally derived" refers to materials with equal to or greater than 50% natural or biobased origin by molecular weight, based on renewable carbon content.

As used herein, "natural minerals" refers to inorganic materials occurring naturally in the earth, having a distinctive chemical formula and consistent set of physical properties (e.g. crystalline structure, hardness, colors, etc.). Also included are "derived minerals"—materials obtained through chemical processing of inorganic substances occurring naturally in the earth, which have the same chemical composition as natural mineral ingredients (e.g. calcium carbonate, silica, hydrated silica, sodium fluoride, titanium dioxide).

As used herein, "bio-based" refers to materials containing carbon of renewable origin from agricultural, plant, animal, fungi, microorganisms, marine, or forestry materials.

As used herein, "renewable" refers to materials that are part of earth's natural environment. Renewable resources are naturally occurring, and can be replenished to replace the portion depleted by usage and consumption, either through natural reproduction or other recurring processes, in a finite amount of time (such as within a human lifetime).

As used herein, "sustainable" refers to the quality of not being harmful to the environment or depleting natural resources, and thereby supporting long-term ecological balance.

Water-Based Ink Compositions

With the increased emphasis on using natural materials, there is now a need in the marketplace for water-based printing inks based on these natural materials. The inks of the present invention preferably comprise greater than 70% natural materials, based on the total weight of the composition; or equal to or greater than 75%; or equal to or greater than 80%; or equal to or greater than 90%; or equal to or greater than 95%; or equal or greater than 98%. In preferred embodiments, the inks of the present invention comprise 99% to 100% natural materials, based on the total weight of the composition (total weight of the ink in its wet state).

The ink compositions of the present invention comprise water, and one or more other natural materials. At least one other natural material is a natural resin. In certain embodiments, the ink compositions of the present invention further comprise one or more organic solvents, wherein the solvents are preferably bio-solvents. In some embodiments, the ink compositions of the present invention comprise one or more natural colorants. In some embodiments, the ink compositions of the present invention comprise one or more natural additives.

The inks of the present invention may contain small amounts of non-natural materials. Such non-natural materials include, for example, pigments, dyes, neutralizing agents such as ammonia, waxes, additives, by-products, and the like. In a preferred embodiment, the total amount of non-natural materials would be less than or equal to 50%, based on the total weight of the ink in its wet state. In a more preferred embodiment, the total amount of non-natural materials is less than or equal to 40%, based on the total weight of the ink in its wet state; or less than or equal to 30%; or less than or equally to 10%, or less than or equal to 5%. Most preferably, the inks of the present invention contain less than or equal to 2% non-natural materials, based on the total weight of the ink in its wet state.

The ink compositions of the present invention typically comprise about 20 wt % to about 70 wt % water, based on the total weight of the composition (the ink composition in its wet state). For example, the ink compositions of the present invention may comprise about 20 wt % to about 65 wt % water, based on the total weight of the composition; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 70 wt %; or about 25 wt % to about 65 wt %; to about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 70 wt %; or about 50 wt % to about 65 wt %; or about 50 wt % to about 60 wt %; or about 50 wt % to about 55 wt %; or about 55 wt % to about 70 wt %; or about 55 wt % to about 65 wt %; or about 55 wt % to about 60 wt %; or about 60 wt % to about 70 wt %; or about 60 wt % to about 65 wt %; or about 65 wt % to about 70 wt %.

The ink compositions may contain no organic solvents. When organic solvents are present, the ink compositions of the present invention typically comprise about 1 wt % to about 20 wt % organic solvent, based on the total weight of the composition. For example, the ink compositions of the present invention may comprise about 1 wt % to about 15 wt % organic solvents, based on the total weight of the composition; or about 1 wt % to about 10 wt %; or about 1 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %.

In preferred embodiments, one or more organic solvents used in the inks of the present invention are bio-based solvents (natural materials). Bio-solvents are renewable and non-toxic. Biomass is a renewable resource for producing bio-solvents. For example, starch, lignocellulose, plant oils, animal fats and proteins can be used to synthesize various bio-derived solvents, including, but not limited to, acids, alkanes, aromatics, ionic liquids (ILs), furans, esters, ethers, liquid polymers and deep eutectic solvents (DESs). Bio-solvents include, but are not limited to, bio-alcohols, bio-ethers, bio-esters, bio-acids, bio-fatty acid methyl esters. In certain embodiments, bio-alcohols are preferred. A preferred bio-alcohol is bio-propanol. Blends of bio-solvents are also suitable for use in the inks of the present invention. Suitable bio-solvents include, but are not limited to, PRO-100™ (chimista Specialty Chemicals); Augeo™ (Solvay); and Cyrene™ (dihydrolevoglucosenone; Circa Group). In the coatings industry, PRO-100™ is a useful bio-solvent blend that can be used in industrial, architectural, DTM (Direct to Metal), and other coatings and coating application. The solubility parameters of PRO-100™ are similar to those of n-propanol, making it an excellent bio-based, performance alternative for formulators wanting to increase the bio-renewable carbon content in their formulations. PRO-100™ contains greater than 95% bio-renewable carbon.

Preferably, the organic solvents of the inks of the present invention contain equal to or greater than 20 wt % bio-solvents, based on the total weight of the solvents. For example, the organic solvents may contain equal to or greater than 25 wt % bio-solvents, based on the total weight of the solvents; or equal to or greater than 30 wt %; or equal to or greater than 35 wt %; or equal to or greater than 40 wt %; or equal to or greater than 45 wt %; or equal to or greater than 50 wt %; or equal to or greater than 55 wt %; or equal to or greater than 60 wt %; or equal to or greater than 65 wt %; or equal to or greater than 70 wt %; or equal to or greater than 75 wt %; or equal to or greater than 80 wt %; or equal to or greater than 85 wt %; or equal to or greater than 90 wt %; or equal to or greater than 95 wt %. In particularly preferred embodiments, the organic solvents comprise 100 wt % bio-solvents, based on the total weight of the solvents.

The ink compositions of the present invention comprise one or more natural resins. Natural resins include, but are not limited to, rosin, modified rosins, rosin esters, modified rosin esters, saccharides, polysaccharides, soy protein, epoxidized soybean oil-dampened nitrocellulose, gum Arabic, and the like. Modified rosin esters include, but are not limited to, fumaric modified rosin ester, maleic modified rosin ester, phenolic modified rosin ester, and the like. It was found that soy protein, polysaccharide, and rosin ester exhibited good print appearance and rub resistance (as measured with a Sutherland tester). A preferred resin is fumaric modified rosin ester.

The ink compositions of the present invention typically comprise natural resins in an amount of about 10 wt % to about 40 wt %, based on the total weight of the composition (in its wet state). For example, the ink compositions of the present invention may contain about 10 wt % to about 35 wt % natural resins, based on the total weight of the composition; or about 10 wt % to about 30 wt %; or about 10 wt % to about 25 wt %; or about 10 wt % to about 20 wt %; or about 10 wt % to about 15 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 40 wt %; or about 20 wt % to about 35 wt %; or about 20 wt % to about 30 wt %; or about 20 wt % to about 25 wt %; or about 25 wt % to about 40 wt %; or about 25 wt % to about 35 wt %; or about 25 wt % to about 30 wt %; or about 30 wt % to about 40 wt %; or about 30 wt % to about 35 wt %; or about 35 wt % to about 40 wt %.

In some embodiments, the ink compositions of the invention may contain no additives. In other embodiments, the ink compositions of the present invention may include one or more natural additives. Natural additives include defoamers, waxes, surfactants, and the like. When present, the additives are each individually present in the ink compositions of the present invention in an amount of about 0.1 wt % to about 10 wt %, based on the total weight of the ink composition. For example, the ink compositions of the invention may comprise about 0.1 wt % to about 5 wt % natural defoamers, based on the total weight of the composition. For example, the ink compositions may comprise about 1 wt % to about 10 wt % waxes, based on the total weight of the composition.

In certain embodiments, the ink compositions of the invention may comprise one or more neutralizing agents, such as ammonia, amines, sodium hydroxide, and the like. When present, the ink compositions of the present invention comprise neutralizing agents in an amount of about 1 wt % to about 10 wt %, based on the total weight of the composition. For example, the ink compositions of the present invention may comprise about 1 wt % to about 5 wt % neutralizing agents, based on the total weight of the composition.

In a preferred embodiment, the inks of the present invention would not contribute a higher level of greenhouse gas emissions in comparison to their current solvent-based alternatives.

Preferably, the inks of the present invention, and printed articles comprising the inks, would meet health and safety regulations in the specific countries where the ink is manufactured and used.

Advantageously, the ink compositions of the present invention would have acceptable performance properties (e.g. adhesion, resistance, printability, etc.) for their end-use requirements. In a preferred embodiment, the water-based inks of the present invention would perform equally to the current solvent-based alternatives. But this is not an absolute requirement, as long as the water-based inks of the present invention meet customer demands and specifications for ink performance. Other preferred advantageous qualities of the inks of the present invention include good printability and acceptable pass skin patch testing (no irritation).

The inks of the present invention are suitable for printing on various substrates. Suitable substrates include, but are not limited to, cotton, or synthetic materials. Synthetic materials include spunbond nonwoven fabrics consisting of polypropylene, polyester, and the like. The inks of the present invention are advantageously suitable for printing on personal care products, such as those exposed to moisture, bodily fluids, chemicals, abrasion, and the like. Personal care products include, but are not limited to, feminine care ("femcare"), such a feminine hygiene and sanitary napkin products; baby care, such as diapers and wipes; other disposable absorbent articles; and other personal care end use applications. The inks would preferably also meet end use requirements consistent with those that are needed for femcare and baby care products. For example, the inks would preferably have an Ink Adhesion Rating (IAR) of equal to or greater than 4.0 for dry rub and saline rub. In certain embodiments, the inks of the present invention would also have a mineral oil IAR of 4.0 or higher. Ink adhesion can, for example, be measured with a Sutherland rub tester.

EXAMPLES

The following examples illustrate specific aspects of the present invention, and are not intended to limit the scope thereof in any respect, and should not be so construed.

Examples 1 to 6. Formulations of Inks

The formulations of inventive Examples 1 to 6 are shown in Tables 1 to 6, respectively.

TABLE 1

Example 1 blue ink

| Component | Wt. % |
|---|---|
| Water | 45.6 |
| Fumaric modified rosin ester (FILTREZ 5014) | 20.4 |
| Mineral based pigment (C431810:01:SUNCROMA ® ULTRAMARINE BLUE | 14.2 |
| Bio-propanol (Chimista PRO-100) | 9.4 |
| Anionic carnauba wax emulsion (Aquabead 425E) | 5.7 |
| Ammonia | 4.4 |
| Soybean oil based defoamer (FOAM-A-TAC ® 2-255-37) | 0.3 |
| Total | 100 |

TABLE 2

Example 2 violet ink

| Component | Wt. % |
|---|---|
| Water | 45.6 |
| Fumaric modified rosin ester (FILTREZ 5014) | 20.4 |
| Mineral based pigment (C434888:01:SUNCROMA ®ULTRAMARINEVIOL) | 14.2 |
| Bio-propanol (Chimista PRO-100) | 9.4 |
| Anionic carnauba wax emulsion (Aquabead 425E) | 5.7 |
| Ammonia | 4.4 |
| Soybean oil based defoamer (FOAM-A-TAC ® 2-255-37) | 0.3 |
| Total | 100 |

TABLE 3

Example 3 violet ink

| Component | Wt. % |
|---|---|
| Water | 52 |
| Fumaric modified rosin ester (FILTREZ 5014) | 20.4 |
| Mineral based pigment (C434888:01:SUNCROMA ®ULTRAMARINEVIOL) | 14.2 |
| Bio-propanol (Chimista PRO-100) | 3 |
| Anionic carnauba wax emulsion (Aquabead 425E) | 5.7 |
| Ammonia | 4.4 |
| Soybean oil based defoamer (FOAM-A-TAC ® 2-255-37) | 0.3 |
| Total | 100 |

Note that Example 3 is similar to Examples 1 and 2, but with a lower bio-propanol content. This may be advantageous for customers that require lower volatile organic content (VOC) inks. One of ordinary skill in the art would know that the rub performance properties of Example would not be affected by this change, and would be similar to Examples 1 and 2.

TABLE 4

Example 4 clear coating

| Component | Wt. % |
|---|---|
| Water | 60.6 |
| Fumaric modified rosin ester (FILTREZ 5014) | 23.8 |
| Bio-propanol (Chimista PRO-100) | 3.5 |
| Anionic carnauba wax emulsion (Aquabead 425E) | 6.65 |
| Ammonia | 5.1 |
| Soybean oil based defoamer (FOAM-A-TAC ® 2-255-37) | 0.35 |
| Total | 100 |

Because Example 4 is a clear coating, it was not subjected to rub testing because there would be no ink stain transfer to measure.

TABLE 5

Example 5 blue ink (using Linablue pigment)

| Component | Wt. % |
|---|---|
| Water | 45.6 |
| Fumaric modified rosin ester (FILTREZ 5014) | 20.4 |
| Spirulina blue (Linablue) | 14.2 |
| Bio-propanol (Chimista PRO-100) | 9.4 |
| Anionic carnauba wax emulsion (Aquabead 425E) | 5.7 |
| Ammonia | 4.4 |
| Soybean oil based defoamer (FOAM-A-TAC ® 2-255-37) | 0.3 |
| Total | 100 |

TABLE 6

Example 6 blue ink (using a higher pigment load)

| Component | Wt. % |
|---|---|
| Water | 39.9 |
| Fumaric modified rosin ester (FILTREZ 5014) | 20.4 |
| Mineral based pigment C431810:01:SUNCROMA ® ULTRAMARINE BLUE | 25 |
| Bio-propanol (Chimista PRO-100) | 3 |
| Anionic carnauba wax emulsion (Aquabead 425E) | 7 |
| Ammonia | 4.4 |
| Soybean oil based defoamer (FOAM-A-TAC ® 2-255-37) | 0.3 |
| Total | 100 |

Example 7. Assessment of Ink Properties

Examples 1, 2, and 5 were printed onto cotton fabric. Color appearance and rub resistance were assessed.
Methods
Printing Inks were printed onto cotton fabric using a Harper QD proofer, with a 4.3 anilox cylinder. The prints were dried for 24 hours at ambient temperature (about 21° C. to 25° C.).
Color Appearance Color appearance was based on a visual assessment and was based on the requirement that the ink laydown is acceptable and free from defects (i.e. similar to currently acceptable commercial products). Color appearance was rated as either "pass" or "fail" in Table 7.
Dry Rub Test The prints on cotton fabric were tested for their resistance to dry rub. Prints were placed, print side up, on the bed of a Sutherland Rub Tester. A crock cloth was attached to a 4 lb Sutherland sled. The crock cloth was rubbed across the face of the print for 50 cycles, at a speed setting #2.

A cotton fabric standard was generated by following the same rub method, with an unprinted piece of cotton substrate placed on the bed of the Sutherland rub tester. This way the crock cloth abrades the cotton fabric in the same way for both the control and the test fabric.

Color density of the transferred ink stain on the crock cloth was measured as described below.
Saline Rub Test The prints on cotton fabric were tested for their resistance to saline rub. Prints were placed, print side up, on the bed of a Sutherland Rub Tester. A crock cloth was attached to a 4 lb Sutherland sled, and 0.7 g of saline solution was spread evenly across the crock cloth. The crock cloth was rubbed across the face of the print for 50 cycles, at a speed setting #2.

A cotton fabric standard was generated by following the same rub method, with an unprinted piece of cotton substrate placed on the bed of the Sutherland rub tester. This way the crock cloth abrades the cotton fabric in the same way for both the control and the test fabric.

Color density of the transferred ink stain on the crock cloth was measured as described below.
Measuring Color Transfer Color density of the ink transferred from the printed cotton fabric to the crock cloth was measured using a spectrophotometer, at the following settings (instrument setup):
Physical filter . . . No
White base . . . Abs
Observer angle . . . 2 degrees
Density standard . . . ANSI T
C+ formula . . . As indicated in the specifications: standard Delta E* (CIE 1976) or Delta E* (CMC)

All measurements were taken over PG2000 paper. It was important to measure the ink stain on the test fabric—measuring outside the ink stain would give artificially low values. The test area covered as much of the ink traces as possible to represent the ink that actually came off. The crock cloth that was rubbed against the unprinted piece of cotton fabric was set as the baseline reference color for spectrophotometric color density readings. The difference in color values of the ink stain from the reference color, ΔE CMC, was measured.

The ΔE CMC of the ink stain (transferred ink) on the crock cloth was measured 5 times in areas of greatest color transfer. The average of the ΔE readings was taken ($\Delta E_{avg}$). The ink rub rating was calculated according to the following equation:

$$\text{Sutherland Rub Rating} = [5.0 - (0.2554 * \Delta E_{avg})] + [0.0044 * (\Delta E_{avg})^2]$$

A higher number represents better performance, i.e. less ink transfer as indicated by a lower ΔE CMC, with a rating of 5.0 being the best.

The dry and saline Sutherland Rub Rating results in Table 7 are based on the following rating scale:
<3.00=poor/fail
3.00-3.99=some resistance/fail
4.00-4.49=pass/slightly deficient
>4.50—pass/excellent

TABLE 7

Test results

| Example | Color/Appearance | Sutherland Rub Rating Dry | Saline |
|---|---|---|---|
| Example 1 | Pass | 4.61 | 4.52 |
| Example 2 | Pass | 4.84 | 4.73 |
| Example 5 | Pass | 4.59 | 4.61 |

Commercial prints using polyurethane as the binder/resin in the inks have preferred Sutherland rub rating values in the 4.00 to 4.50 range. Thus, the inks of the present invention meet preferred commercial rub resistance standards.

As can be seen from the data, the inks of the present invention, comprising greater than 70 wt % natural materials, exhibit properties similar to, or in some cases better than, currently available products that consist primarily of non-natural materials.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A water-based ink or coating composition comprising:
   a) 20 wt % to 70 wt % water, based on the total weight of the composition; and
   b) 15 wt % to 40 wt % one or more natural resins, based on the total weight of the composition;
   c) 1 wt % to 20 wt % one or more solvents, based on the total weight of the composition;
   d) 1 wt % to 10 wt % one or more natural waxes, based on the total weight of the composition;
   e) 0.1 wt % to 5 wt % one or more natural defoamers, based on the total weight of the composition; and
   f) 1 wt % to 10 wt % one or more neutralizing agents, based on the total weight of the composition;
   wherein the one or more natural resin is selected from the group consisting of rosin, modified rosins, rosin esters, modified rosin esters, epoxidized soybean oil-dampened nitrocellulose, gum Arabic, and combinations thereof;
   wherein the ink or coating composition comprises greater than 70 wt %, up to 100 wt % natural materials, based on the total weight of the composition.

2. The composition of claim 1, wherein the solvents comprise equal to or greater than 50 wt % one or more bio-solvents, based on the total weight of the solvents; wherein the bio-solvents are selected from the group consisting of bio-alcohols, bio-ethers, bio-esters, bio-acids, bio-fatty acid methyl esters, and combinations thereof.

3. The composition of claim 2, wherein at least one bio-solvent is a bio-alcohol.

4. The composition of claim 3, wherein at least one bio-solvent is bio-propanol.

5. The composition of claim 1, further comprising one or more natural colorants, selected from the group consisting of ultramarine blue derived from lapis lazuli, Linablue derived from Spirulina, iron-oxide pigments, copper pigments, titanium pigments, zinc pigments, aluminum pigments, carbon pigments, and combinations thereof.

6. The composition of claim 1, further comprising one or more additives, selected from the group consisting of natural surfactants, natural wetting agents, and combinations thereof.

7. The composition of claim 1, wherein the neutralizing agents are selected from the group consisting of ammonia, amines, sodium hydroxide, and combinations thereof; and/or wherein the natural defoamer is a soybean oil based defoamer; and/or wherein the one or more natural waxes are derived from plants or animals, or combinations thereof.

8. The composition of claim 7, wherein the one or more natural waxes are selected from the group consisting of carnauba wax, jojoba oil wax, candellila wax, ouricury wax, bayberry wax, castor wax, esparto wax, rice bran wax, soy wax, tallow tree wax, Japan wax, beeswax, lanolin, shellac, Chinese wax, spermaceti, and combinations thereof.

9. The composition of claim 5, comprising 1 wt % to 40 wt % one or more natural colorants, based on the total weight of the composition.

10. The composition of claim 1, comprising equal to or greater than 75 wt % natural materials, based on the total weight of the composition.

11. The composition of claim 1, comprising equal to or greater than 90 wt % natural materials, based on the total weight of the composition.

12. The composition of claim 1, comprising 100 wt % natural materials, based on the total weight of the composition.

13. A printed substrate comprising the composition of claim 1, wherein the substrate is selected from the group consisting of cotton, and spun bond non-woven fabrics.

14. The printed substrate of claim 13, wherein the spunbond non-woven fabrics comprise polypropylene and/or polyester.

15. A printed article comprising the printed substrate of claim 13.

16. The printed article of claim 15, wherein the article is a feminine care product, baby care product, or personal care product.

17. A method of preparing a printed substrate, comprising the steps of:
   a) providing a substrate;
   b) providing an ink or coating composition of claim 1;
   c) applying the ink or coating composition to the substrate; and
   d) drying the ink or coating composition on the substrate.

18. The method of claim 17, wherein the substrate is selected from the group consisting of cotton and spunbond fabrics.

19. The method of claim 18, wherein the spunbond fabric comprises polypropylene and/or polyester.

20. A printed substrate prepared by the method of claim 17.

21. A printed article comprising the printed substrate of claim 20.

22. The printed article of claim 21, wherein the article is a feminine care product, baby care product, or personal care product.

23. The composition of claim 1, comprising 20 wt % to 40 wt % one or more natural resins, based on the total weight of the composition.

* * * * *